(12) United States Patent
Jaiswal et al.

(10) Patent No.: US 8,144,855 B2
(45) Date of Patent: Mar. 27, 2012

(54) OPTIMIZING INTERACTIVE VOICE RESPONSE UNIT PORT UTILIZATION

(75) Inventors: Peeyush Jaiswal, Boca Raton, FL (US); Naveen Narayan, Flower Mound, TX (US)

(73) Assignee: International Business Machines Corporation, Armonk, NY (US)

( * ) Notice: Subject to any disclaimer, the term of this patent is extended or adjusted under 35 U.S.C. 154(b) by 1268 days.

(21) Appl. No.: 11/834,080

(22) Filed: Aug. 6, 2007

(65) Prior Publication Data

US 2009/0041210 A1 Feb. 12, 2009

(51) Int. Cl.
*H04M 1/64* (2006.01)
*H04M 3/42* (2006.01)
*H04M 3/00* (2006.01)

(52) U.S. Cl. ........... 379/202.01; 379/88.17; 379/203.01; 379/204.01; 379/265.02

(58) Field of Classification Search .................... 379/76, 379/88.17, 202.01, 203.01, 204.01
See application file for complete search history.

(56) References Cited

U.S. PATENT DOCUMENTS

| 7,535,998 | B2 * | 5/2009 | Reynolds | 379/88.18 |
|---|---|---|---|---|
| 2002/0118816 | A1 * | 8/2002 | Flockhart et al. | 379/265.12 |
| 2006/0069568 | A1 * | 3/2006 | Passaretti et al. | 704/270 |
| 2006/0126803 | A1 * | 6/2006 | Patel et al. | 379/88.01 |

* cited by examiner

*Primary Examiner* — Ahmad Matar
*Assistant Examiner* — Nafiz E Hoque
(74) *Attorney, Agent, or Firm* — Yudell Isidore Ng Russell PLLC (57) ABSTRACT

A method of and system for optimizing interactive voice response (IVR) unit port utilization starts each call of a plurality of calls on a separate IVR unit port. The method launches an IVR call flow for each call. Each IVR call flow includes a section that is common to all of the call flows. The method conferences together on a single IVR unit port at least some of the plurality of calls for the common section of the call flow by transferring calls to the single IVR unit port when each transferred call reaches the common section. The method synchronizes the calls conferenced together on the single port by inserting into the call flow on the single IVR unit port an on-hold treatment. The method starts the common section of the call flow when all calls have been transferred to the single IVR unit port.

11 Claims, 7 Drawing Sheets

OPTIMIZING INTERACTIVE VOICE RESPONSE UNIT PORT UTILIZATION

BACKGROUND OF THE INVENTION

1. Technical Field

The present invention relates generally to the field of telecommunications, and more particularly to a method of and system for optimizing interactive voice response (IVR) unit port utilization.

2. Description of the Related Art

Most contact center solutions use an interactive voice response (IVR) system of some sort. Generally, such IVR systems facilitate incorporating computer telephone integration (CTI) into the contact center environment. IVR systems can either be connected to a private branch exchange (PBX), such that the PBX receives a call and transfers it to the IVR unit, or the IVR system may interface directly to the outside telephone system. The former configuration is called IVR behind the switch and the latter is called IVR in front of the switch. Whether the IVR is in front of the switch are behind the switch, one of the most costly resources used per call is an IVR unit port. The IVR port houses the call during the entire time the call is being serviced.

SUMMARY OF THE INVENTION

The present invention provides a method of and system for optimizing interactive voice response (IVR) unit port utilization. Systems according to the present invention include an IVR unit having a plurality of ports. Embodiments of the method of the present invention include starting each call of a plurality of calls on a separate IVR unit port. The method launches an IVR call flow for each call. Each IVR call flow includes a section that is common to all of the call flows. The method conferences together on a single IVR unit port at least some of the plurality of calls for the common section of the call flow by transferring calls to the single IVR unit port when each transferred call reaches the common section. The method synchronizes the calls conferenced together on the single port by inserting into the call flow on the single IVR unit port an on-hold treatment. The method starts the common section of the call flow when all calls have been transferred to the single IVR unit port.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
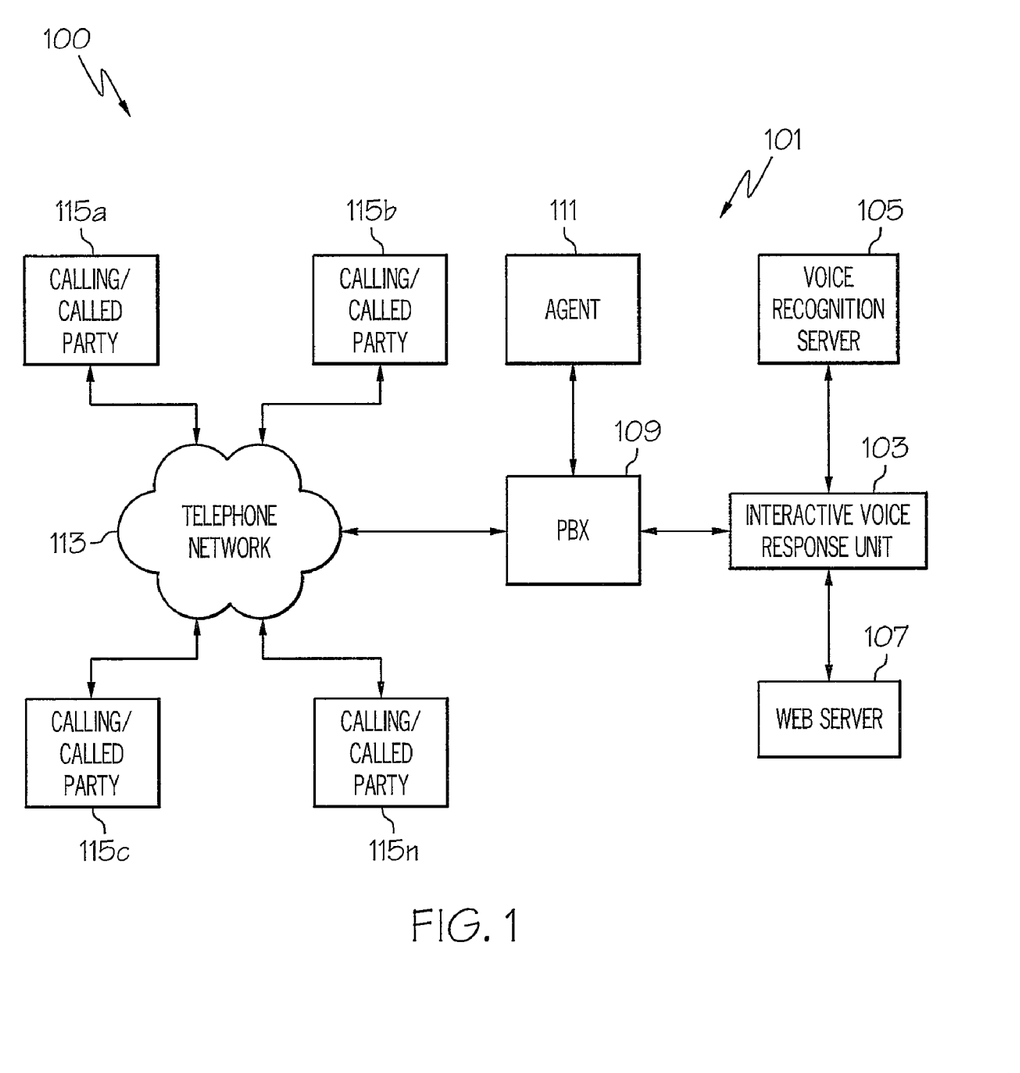
FIG. 1 is a block diagram of an embodiment of a system according to the present invention.

Referring now to the drawings, and first to FIG. 1, a system according to the present invention is designated generally by the numeral 100. System 100 includes an interactive voice response (IVR) platform 101. IVR platform includes at least one interactive voice response unit 103. IVR unit 103 is coupled to at least one voice-recognition server 105 and at least one Web server 107. In the embodiment of FIG. 1, IVR unit 103 is coupled to a PBX 109. PBX 109 may be coupled to at least one human agent 111. PBX 109 is also coupled to a telephone network indicated generally at 113. Telephone network 113 may include a public switched telephone network (PSTN), a voice over IP network, a private network, or a combination thereof. Telephone network 113 may be coupled to a plurality of calling or called parties 115. System 100 is known as an IVR behind the PBX system because PBX 109 is between IVR platform 101 and telephone network 113.

Figure 2:
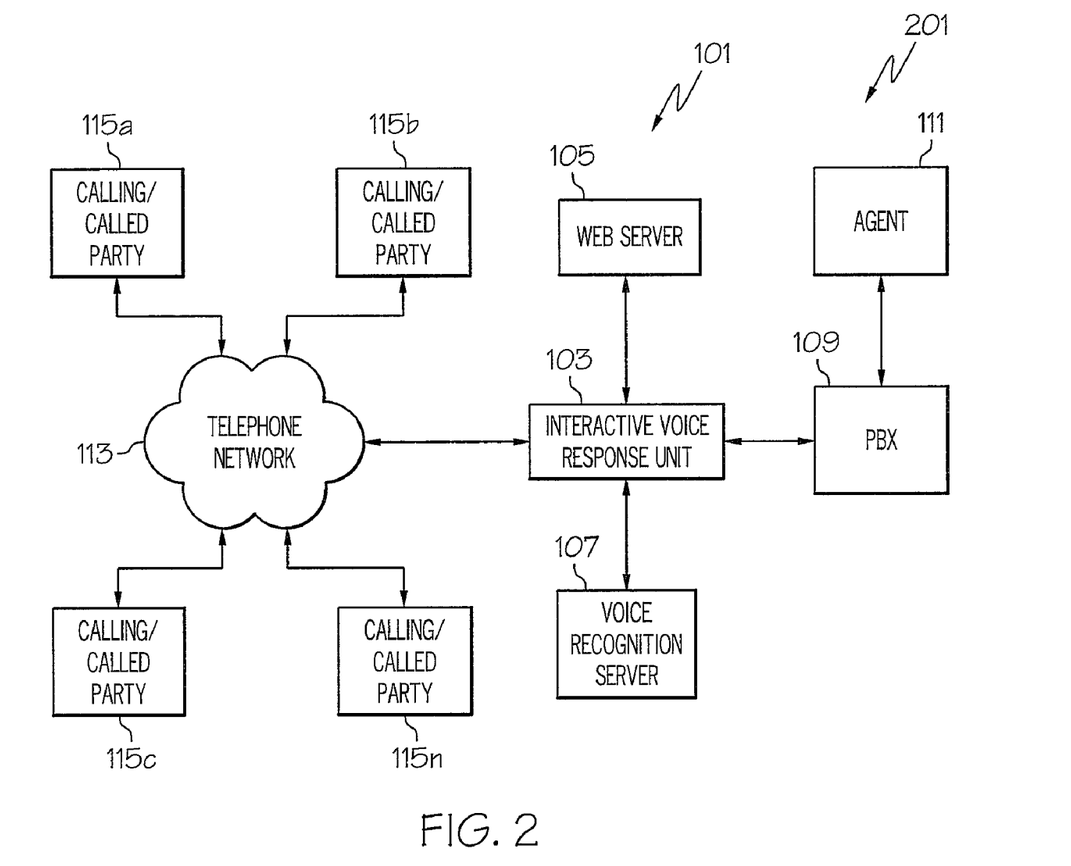
FIG. 2 is a block diagram of a second embodiment of a system according to the present invention.

FIG. 2 illustrates an IVR in front of the PBX system 201. System 201 includes an IVR platform including at least one interactive voice response unit 103, at least one Web server 105, and at least one voice-recognition server 107. Interactive voice response unit 103 is coupled between telephone network 113 and PBX 109. Embodiments of the system and method of the present invention may be implemented in either a system 100 or system 201.

Figure 3:
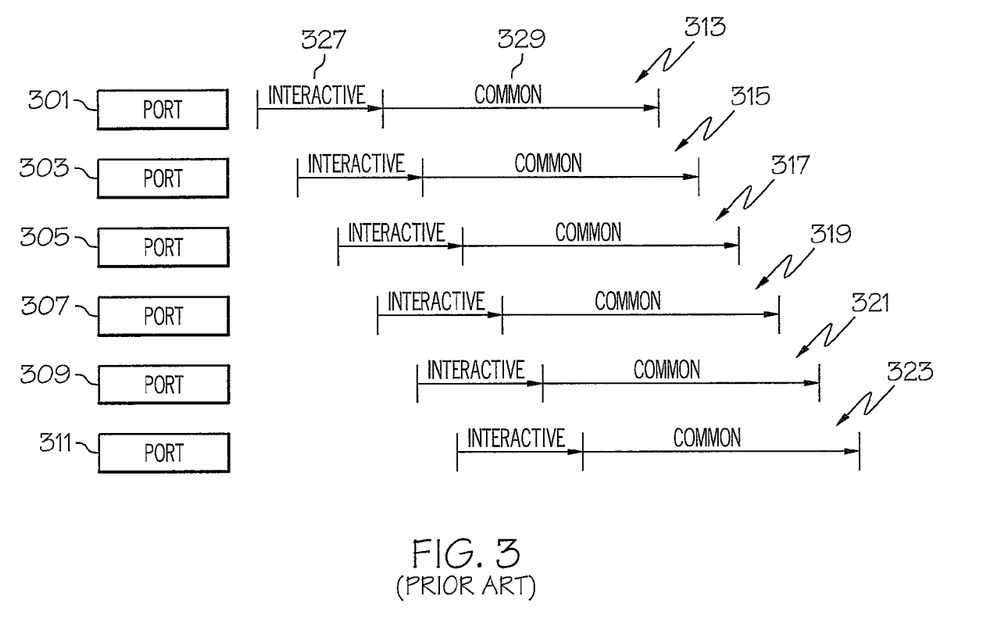
FIG. 3 is a diagram of interactive voice response (IVR) unit port utilization according to the prior art.

As is known to those skilled in the art, IVR units, such as IVR unit 103 includes a plurality of ports. FIG. 3 illustrates IVR unit port utilization according to the prior art. In FIG. 3, six ports 301-311 are illustrated. Each port 301-311 is adapted to handle a single call. An IVR unit spawns or launches a thread or instance for each call. A call thread executes a call flow. Call flows make announcements, issue voice prompts, and interactively respond to actions of the called or calling party. In FIG. 3, call flows 313-323 are supported on ports 301-311, respectively. Call flows 313-323 are illustrated temporally starting at the left and proceeding toward the right. Thus, for example, call flow 315 starts after call flow 313.

Each call thread includes an interactive section 327 and a common section 329. Reference characters 327 and 329 are omitted from call threads 315-323 for the sake of clarity. An interactive section 327 may include voice prompts and responses to identify the caller, subject of the call, and other preliminary information. Although section 327 is identified as interactive, it may amount simply to announcements. Interactive section 327 may be the same or different for each call thread 313-323.

Common section 329 is identical for each call thread 313-323. Common section 329 is non-interactive in that the calling or called party is generally not provided with voice prompts. Typically, common section 329 comprises announcements or other information. For example, common section 329 may comprise a sales presentation or it may provide general information with respect to the IVR system.

As is apparent from FIG. 3, according to the prior art, each port 301-311 is occupied from the beginning to the end of a call flow. Therefore, a port is unavailable for handling another call until its call flow is completed. In FIG. 3, each port 301-311 spends the majority of its time providing the same information as every other port, although at different times and to different calling or called parties.

Figure 4:
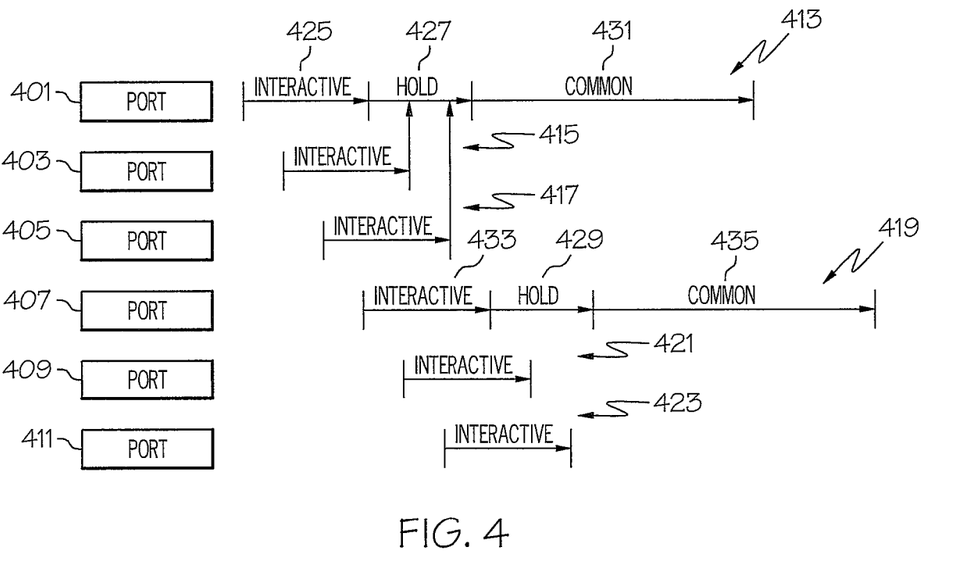
FIG. 4 is a diagram of IVR unit port utilization according to embodiments of the present invention.

FIG. 4 illustrates IVR unit port utilization according to an embodiment of the present invention. As in FIG. 3, six ports 401-411 are illustrated. However, according to the present invention, each port 401-411 is adapted to conference together multiple calls. Each port 401-411 launches a call thread 413-423, respectively. Each call thread 413-423 includes an interactive section 425. Interactive sections 425 may be the same as or similar to interactive sections 327 of FIG. 3. However, as will be explained in detail hereinafter, embodiments of the present invention are adapted to insert a hold section 427-429 into selected call threads 413-423. In FIG. 4, a hold section 427 is inserted after interactive section 425 and before common section 431 of call thread 413. Similarly, a hold section 429 is inserted after interactive session for 33 and before common section 435 of call thread 419.

According to embodiments of the present invention, when a call thread such as call thread 413 approaches or reaches the end of interactive section 425, call thread 413 broadcasts a query informing the other active threads that it is about ready to commence common section 431 and asking the other threads if they are within a time period equal to the length of hold 427 of entering common section 431. In FIG. 4, threads 415 and 417 are within such time period. Accordingly, when call thread 413 reaches the end of interactive section 425, it enters hold section 427. When call threads 415 and 417 reach the end of their respective interactive sections, calls 415 and 417 are transferred from ports 403 and 405, respectively, to port 401. Thus, call threads 415 and 417 are conferenced into call thread 413, thereby freeing ports 403 and 405 to handle more calls. In similar fashion, call threads 421 and 423 are conferenced into call thread 419 on port 407, thereby freeing ports 409 and 411.

The length of hold section 427 may be selected so to balance caller hold time with port utilization efficiency. The longer the hold time, the more calls may be conferenced into the common section on a single port. However, the longer the hold time, the more likely it is that a caller will hang up before reaching the common section. In high volume applications, such as mass outbound calling campaigns, a large number of calls can be conferenced together in short time, thereby handling many calls per port with minimum hold times.

Figure 5:
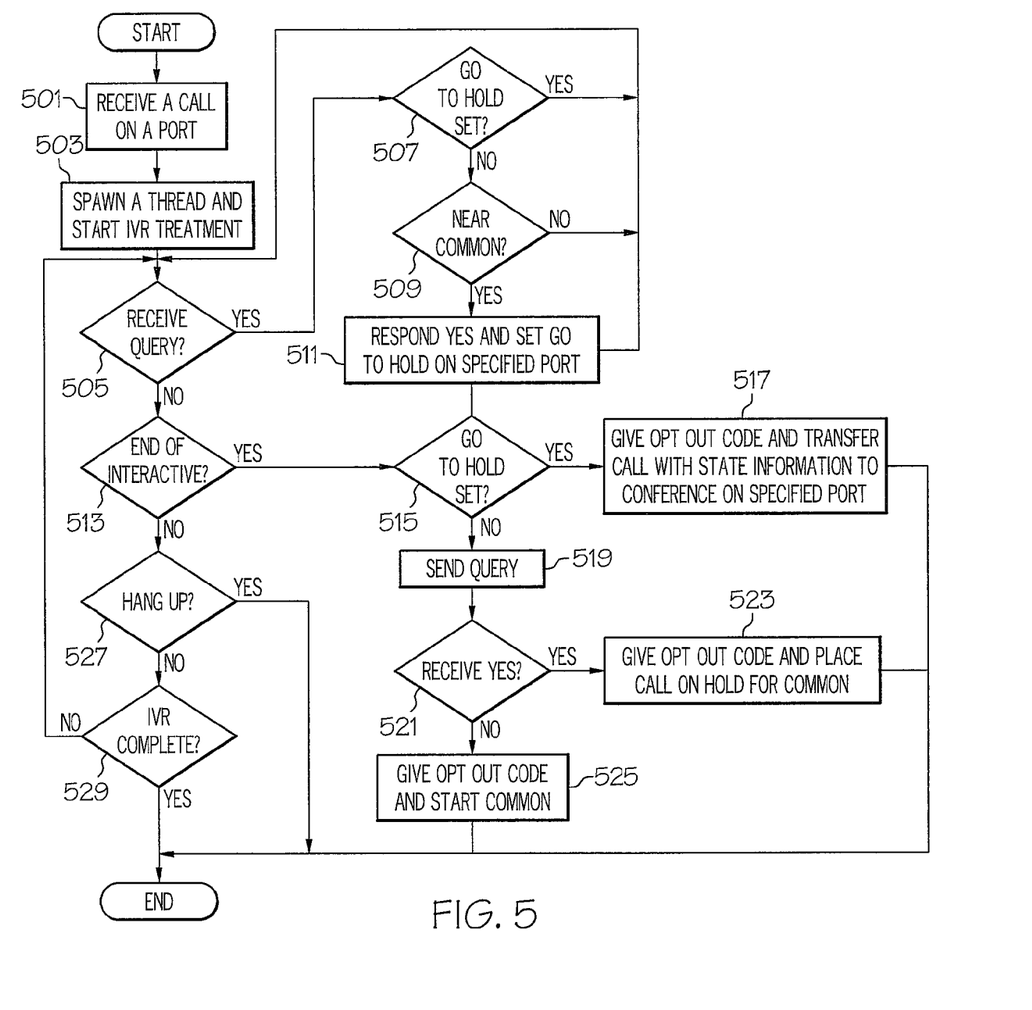
FIG. 5 is a flow chart of an embodiment of IVR call flow thread processing according to the present invention.

FIG. 5 is a flow chart of an embodiment of call thread processing according to the present invention. The IVR unit receives a call on one of its ports, as indicated at block 501. The IVR unit spawns a thread and starts IVR treatment, as indicated at block 503. If, as determined at decision block 505, thread receives a query, the thread determines, at decision block 507, if a go to hold flag is set. As will be explained in detail hereinafter, a thread sets a go to hold flag when it has determined that it will transfer its call to another port. If the go to hold flag is set, processing returns to decision block 505 effectively ignoring the query. Alternatively, the thread could send a negative response to the query. If the go to hold flag is not set, the thread determines, at decision block 509, if it is near a common section in its call flow. As discussed with respect to FIG. 4, a thread is near common section whenever it is within the hold period of the end of its interactive section. If the thread is not near its common section, processing returns to decision block 505. If, on the other hand, the thread is near its common section, it responds yes and sets to go to hold on the port specified in the query, as indicated at block 511. Then, processing returns to decision block 505.

If, as determined at decision block 513, the thread reaches the end of its interactive section, the thread determines, at decision block 515, if it has a go to hold flag set. A go to hold flag set would indicate that the thread had received and responded affirmatively to an earlier query from another call thread. If so, the thread gives an opt out code to the calling party and transfers the call, with state information, to conference on the port specified in the query, as indicated at block 517. The call thread collects and maintains state information during the course of the call. State information includes an identifier the uniquely identifies the call. An example of a call identifier would be the time stamp when the call was received and the ANI of the call. State information may also include validation or authentication information for the calling party. Although the call is transferred to a conference port, the call retains its separate identity. An opt out code is a sequence of digits the calling party can enter to be transferred to a live agent. A call is transferred to an agent with its state information. The system may perform revalidation to make sure the correct call has been transferred. If, as determined at decision block 515, a go to hold flag has not been set, the thread sends a query, as indicated at block 519. A query may include the identifier of the port assigned to the thread sending the query and the identity of the call flow it is executing. If, as determined at decision block 521, the thread receives an affirmative response from any other thread, the thread gives the calling party an opt out code and places the call on hold for common, as indicated at block 523. If, as determined at decision block 521, the thread does not receive an affirmative response from any other thread, the thread gives the calling party an opt out code and starts the common section, as indicated at block 525. If, as indicated at decision block 527, the calling party hangs up before reaching end of the interactive section or the end of the call flow, processing ends. Finally, if, as determined at decision block 529, the IVR treatment is complete, processing ends.

Figure 6:
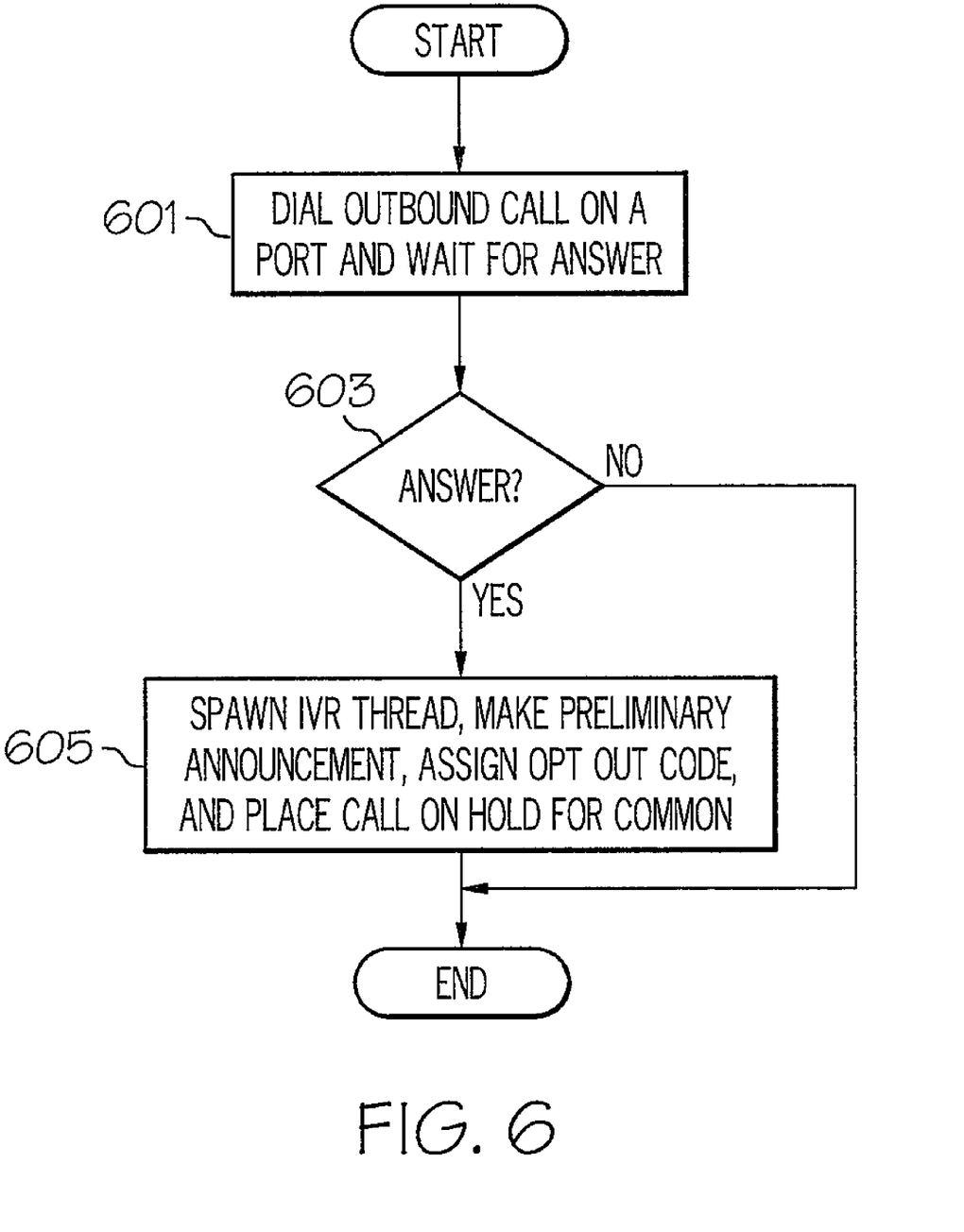
FIG. 6 is a flow chart of a second embodiment of IVR call flow thread processing according to the present invention; and, FIG. 7 is a flow chart of an embodiment of conferenced common call flow processing according to the present invention.

FIG. 6 is a flow chart of an alternative embodiment of call thread processing according to the present invention. The system dials an outbound call and waits for an answer at block 601. If, as determined at decision block 603, the call is answered, the system spawns an IVR thread, makes a preliminary announcement, gives the called party an opt out code, and places the call on hold for common, as indicated at block 605. An example of a preliminary announce would be "Hello, this is XYZ. Please hold for an important message. You may be transferred to an agent at any time by entering *X on your telephone keypad." The system may place the call on hold for common on a dedicated common port or it may place the call on hold for common on a port assigned to an earlier outbound call.

Figure 7:
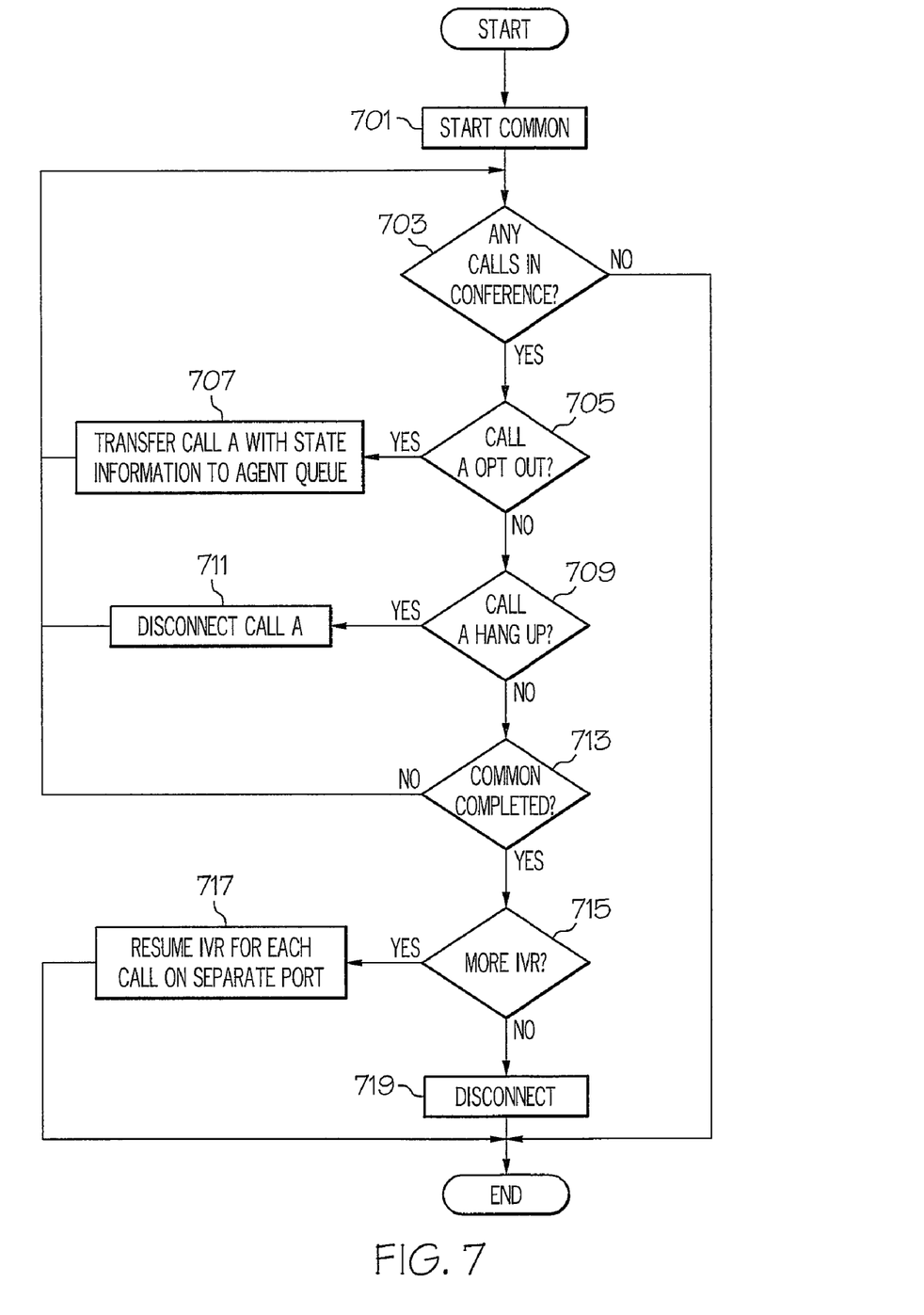

FIG. 7 is a flow chart of common processing according to an embodiment of the present invention. The system starts the common section of the call flow as indicated at block 701. The system determines, at decision block 703, if any calls are remaining in the conference. If not, processing ends. If, as determined at decision block 73, calls do remain in the conference, the system determines, at decision block 705, if a call, designated generally as call A, has opted out of the common section. If so, the system transfers call A, with its state information, to an agent queue, as indicated at block 707, and processing returns to decision block 703. If, as determined at block 709, a call, designated generally as call A, hangs up, the system disconnects call A, at block 711, and returns to decision block 73. If, as determined at decision block 713, the common section is completed, the system determines, at decision block 715, if there is more IVR treatment. If so, the system resumes IVR for each remaining call on a separate port, as indicated at block 717. If, as determined at decision block 715, there is no more IVR treatment, the system disconnects, at block 719, and processing ends.

From the foregoing, it will be apparent to those skilled in the art that systems and methods according to the present invention are well adapted to overcome the shortcomings of the prior art. While the present invention has been described with reference to presently preferred embodiments, those skilled in the art, given the benefit of the foregoing description, will recognize alternative embodiments. Accordingly, the foregoing description is intended for purposes of illustration and not of limitation.

What is claimed is:

1. A method of optimizing interactive voice response (IVR) unit port utilization, the method comprising:
   starting a plurality of calls, by:
   receiving each call of said plurality of calls,
   assigning each call of said plurality of calls to a separate IVR unit port, and
   launching an IVR call flow for each received call, each call having a unique position in said IVR call flow, said IVR call flow including a common section;
   determining said unique position of at least some of the calls; and
   conferencing together, on a single IVR port, any of said calls for which said unique position is determined to be within a predetermined time period preceding said common section within said IVR call flow, wherein said conferencing together comprises:
      placing a first call of said plurality of calls to reach said common section on hold;
      transferring, to the IVR port assigned to said first of said plurality of calls, each other call of said plurality of calls determined to be within said predetermined time period, wherein the transferring occurs as said each other call reaches said common section; and
      starting said common section in response to determining that all of said plurality of calls have been transferred to said IVR port assigned to said first of said calls, wherein the unique position of all of said plurality of calls is within said predetermined time period.

2. The method as claimed in claim 1, wherein said conferencing together comprises:
   synchronizing said plurality of calls.

3. The method as claimed in claim 2, wherein said synchronizing comprises:
   conferencing together said plurality of calls into an on-hold condition; and
   changing said on-hold condition to a common call flow.

4. The method as claimed in claim 1, further comprising:
   providing each call of said plurality of calls with a code for opting out of said conference.

5. The method as claimed in claim 1, further comprising:
   maintaining state information for each call of said plurality of calls.

6. The method as claimed in claim 1, wherein said starting said plurality of calls comprises:
   placing a plurality of outbound calls;
   assigning each of said plurality of outbound calls to a separate IVR unit port; and
   launching the IVR call flow for each outbound call, said IVR call flow including the common section.

7. The method as claimed in claim 6, wherein said conferencing together comprises:
   transferring at least some of said plurality of outbound calls to a single IVR unit port when each of said at least some of said outbound calls reaches said common section;
   maintaining said single IVR port in an on-hold condition until all of said at least some of said outbound calls have been transferred to said single IVR unit port; and
   starting said common section on said single IVR unit port.

8. The method as claimed in claim 1, further comprising:
   providing each call transferred to said first port with an opt out code; and
   transferring said second call from said first port to a second port in response to entry of said opt out code during said common section.

9. An interactive voice response (IVR) system, which comprises:
   a plurality of ports; and
   an IVR unit, configured to:
      assign each call of a plurality of calls to a respective port of the plurality of ports,
      launch an IVR call flow for each call, each call having a unique position in said IVR call flow, said IVR call flow including a common section,
      determine said unique position of at least some of the calls, and
   conference together, on one of said ports, any of said plurality of calls for which said unique position is determined to be within a predetermined time period preceding said common section within said IVR call flow, wherein said conferencing together comprises:
      placing a first call of said plurality of calls to reach said common section on hold;
      transferring, to the IVR port assigned to said first of said plurality of calls, each other call of said plurality of calls determined to be within said predetermined time period, wherein the transferring occurs as said each other call reaches said common section; and
      starting said common section in response to determining that all of said plurality of calls have been transferred to said IVR port assigned to said first of said calls, wherein the unique position of all of said plurality of calls is within said predetermined time period.

10. The system as claimed in claim 9, the IVR unit further configured to:
    insert an on-hold treatment into the call flow for a first call to reach said common section.

11. The system as claimed in claim 10, the IVR unit further configured to:
    end said on-hold treatment when all of said calls have been transferred to said one of said ports; and
    start said common section.

* * * * *